United States Patent

Miller

[15] 3,674,169
[45] July 4, 1972

[54] VALVE BOXES

[72] Inventor: John H. Miller, 1031 N. 14th St., Manitowoc, Wis. 54220

[22] Filed: Sept. 22, 1970

[21] Appl. No.: 74,375

[52] U.S. Cl. ...................................220/4 R, 220/8, 220/18, 220/80, 220/81
[51] Int. Cl. ...................................B65d 7/24, B65d 11/18
[58] Field of Search .................220/3.92, 3.94, 4 R, 4 A, 4 E, 220/8, 18, 80, 81

[56] References Cited

UNITED STATES PATENTS

| | | | |
|---|---|---|---|
| 2,008,138 | 7/1935 | Le Duc | 220/3.92 X |
| 2,186,431 | 1/1940 | Riley | 220/8 X |
| 3,263,853 | 8/1966 | Smith | 220/18 |
| 3,072,285 | 1/1963 | Aileo | 220/80 X |
| 1,101,892 | 6/1914 | Vibber | 220/3.94 X |

Primary Examiner—George E. Lowrance
Attorney—Alter, Weiss & Whitesel

[57] ABSTRACT

An underground valve housing made of waterproof and insulating material is sealed around a valve in a pipe. The housing has an air shaft which rises to the surface of the ground to vent any escaping gas and to give ready access to the valve in case it must be closed under emergency conditions.

4 Claims, 4 Drawing Figures

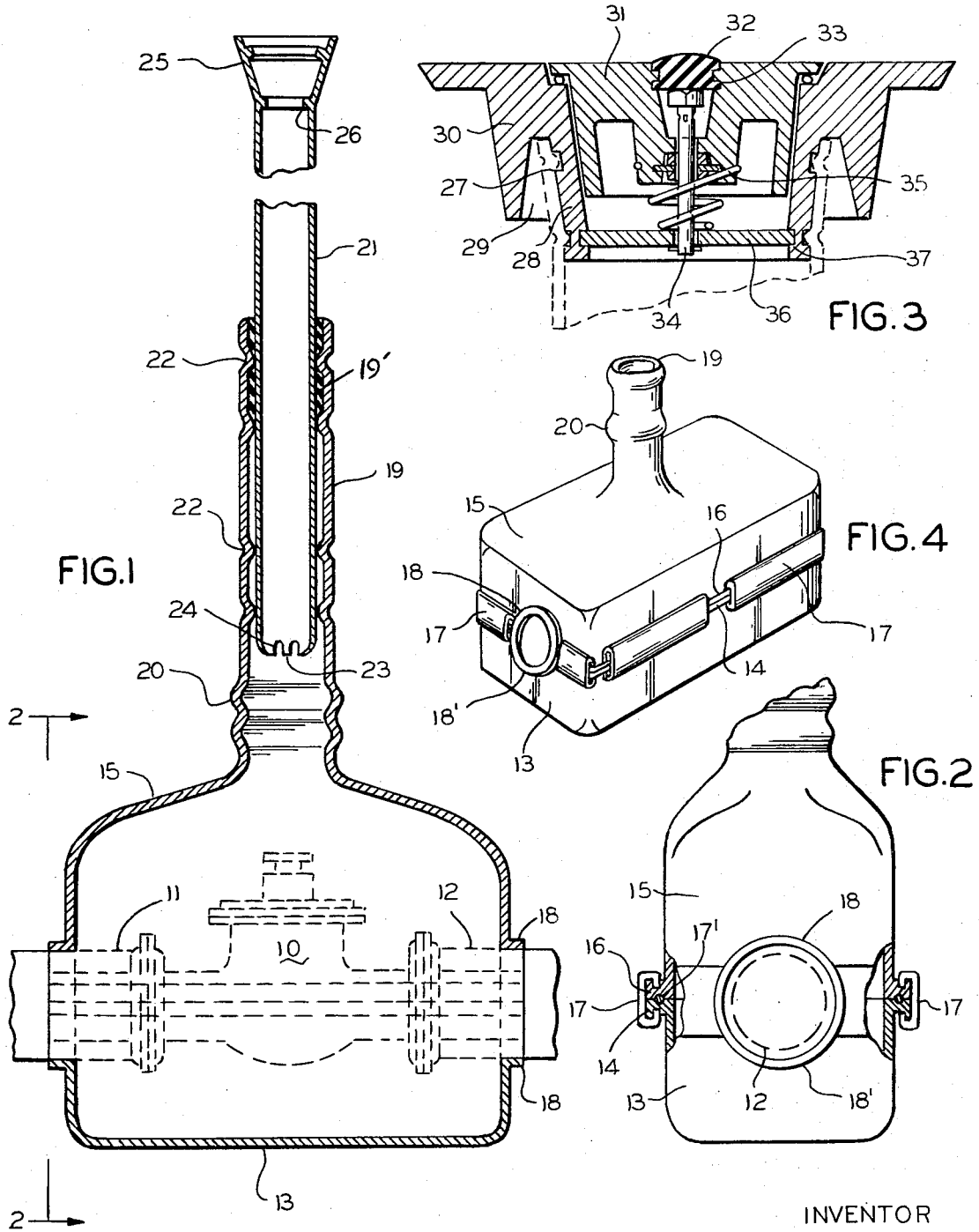

VALVE BOXES

My invention relates to underground valve boxes, and more particularly to a water resistant enclosure that allows ready access to the valve enclosed therein.

There are many reasons for failures in underground plumbing. For example, ground water, moisture, and other contaminents tend to rust, rot, or otherwise attack metal in the pipes, joints, and valves. Also electrical or galvanic currents flow between underground metals responsive to naturally occurring potential differences at the molecular levels. Here the underground water behaves as a battery. The galvanic currents eat away one of the metals, depending upon the direction of current flow. Finally, the pressure differentials between the inside and outside of the pipe tends to cause some leakage. Thereafter, the materials which are inside and outside the pipe may combine to form a chemical reaction which corrodes the pipe and its fittings. Accordingly, it is desirable to provide a waterproof housing of electrically insulating material which encloses the pipe and its joints.

In addition to these and other considerations, underground pipes present still other problems. First, the valve is provided since it may become necessary to close it under some emergency conditions. Second, the valve may tend to vent gas under some conditions. If so, the gas should be conducted to the atmosphere to prevent damage to vegetation. Therefore, it is necessary to provide an air shaft extending from the housing to the surface of the ground. However, such air shaft should not provide a passage by which contaminents may enter the housing.

Accordingly, an object of my invention is to provide a housing device that encloses valves to prevent water, ice or other foreign matter from rendering them inoperative or inaccessible.

Another object of my invention is to provide a housing device that prevents corrosion or other deterioration of the valve and its accessories which may be caused by environmental conditions.

Still another object of my invention is to provide a housing device that prevents underground migration of gas to or from a leaking valve.

A still further object is to construct the housing device in a manner which permits the valve box cover to release any gas leaking from the valve into the atmosphere.

A further object is to provide a housing device of the character described that is able to accommodate various sizes of valves and pipes of varied diameter.

A still further object of my invention is to provide a device that will enable maintenance and periodic checking of the enclosed valve.

In keeping with an aspect of the invention, these and other objects are accomplished by a housing device which is simple in construction and easily applied. Here a suitable non-corrosive, electrically insulating material is formed into a housing for underground valves. The housing prevents galvanic currents and blocks the flow of water, chemicals, and other material which may cause corrosion. The housing is open to the surface of the ground to give access to the valves when leakage occurs, and for maintenance purposes. Thus, my invention provides a device that permits a sealing of the enclosure to eliminate moisture from contacting the valve and yet permits gas leakage to be discharged to the surface of the ground.

Other and further objects of my invention will become more apparent as the description proceeds, when taken in conjunction with the drawings, in which:

FIG. 1 is a cross sectional longitudinal view of the body and tubes forming a part of the inventive device;

FIG. 2 is a fragmentary cross sectional view taken along line 2—2 of FIG. 1, showing the valve housing and illustrating in cross section the sealing flanges;

FIG. 3 is a cross sectional view of the valve-type surface lid; and

FIG. 4 is a perspective view of the complete valve enclosure or housing.

Similar reference characters indicate corresponding parts and features throughout the several views. More particularly, the reference character 10 generally identifies the valve (shown in phantom) with the pipes 11 and 12 leading to and from the valve 10.

The inventive housing, for the protection and enclosure of the valve 10, includes a lower section 13 having outwardly projecting flanges 14, and an upper body section 15, also having outwardly projecting flanges 16. The upper and lower sections correspond in size and contour. These flanges 14 and 16 may be of any suitable thickness and they are adapted to receive and support clamping members which are crimped on, as shown at 17. (see FIGS. 2 and 4). A suitable gasket 17' or "O-ring" may be positioned between the flanges as a moisture seal.

The body sections 15 and 13 are to be constructed of a pliable material, such as plastic, impregnated fiber glass, or the like. The clamping members 17 may be of any practical and efficient design such as spring metal.

Both the body 15 and the lower section 13 terminate into semicircular sections shown as 18 and 18', to encircle the outer peripheral surface of the pipes 11 and 12. These openings may be sealed by conventional washers, or gaskets attached and supported thereby, in any efficient manner to seal the enclosure formed by the parts 13 and 15.

By referring to FIG. 1, it will be noted that the body 15 is equipped with an upper tubular section 19, here shown with annular corrugations 20. Another tube 21 slidably engages the tubular section 19 and is guided by inwardly extending into the tube by ridges 22, forming an integral part of the tubular section 19. Suitable packing 19' may be added at one or more places as a sealing material between the tubes.

The tube 21 is here shown as equipped at its lower end with a plurality of sections 23 formed by the slots 24 and extending inward. The upper end 25 of the tube 21 is angularly spread outward to accommodate a valve lid assembly, shown in FIG. 3. The tapered end 25 is equipped with inner ridges 26 which engage the slots 27 (see FIG. 3) of a downwardly extending section 28, forming a part of the recess 29 of the lid 30. The lid supports the insert 31 and places it in a horizontal relationship with respect to the top surface of the lid 30.

The insert 31 is provided with a pliable plug 32 retained in position by the ridges 33. A locking bolt 34 slideably guides the insert 31 and holds it in a downward position by means of the spring 35 attached to the locking arm 36 which, in turn, is supported at 37 by the downwardly extending section 28, forming a part of the lid 30.

From the above description it will become apparent that the device enables easy emergency access to the valve. It puts no strain on the valve or the pipe, and it remains in a constant relationship to the valve. It requires no special cleaning when adjustments are made.

Although I have shown a specific arrangement and construction of the parts and features constituting my invention, many changes may be made without effecting the operativeness of the device. Therefore the claims are to be construed to include all equivalents which fall within the spirit and scope of my invention.

I claim:

1. A protective housing for a valve located under ground comprising a bottom half and a mating top half,
    said mating halves when coupled together forming a horizontal slit running parallel with the pipes feeding into and out from said valve,
    each of said mating halves having flanges thereon extending outwardly therefrom,
    means for sealing said flanges together to prevent moisture from leaking into said housing, mating semi-circular openings in said halves to fit around the pipes entering and leaving said housing,
    gasket means sealing said semi-circular openings,
    clamping means snapped on over said flanges to secure said halves together, and venting means extending vertically from said top half above said valve to the surface of the ground, said venting means being integral to said top half and providing a passage for receiving a shaft used to open and close said valve.

2. The housing of claim 1 wherein said halves are made of an electrically insulating material which is waterproof.

3. The housing of claim 2 wherein said venting means comprises an outer tube that is integral to said top half, an inner telescoping tube vertically and rotatably movable within said outer tube, and said inner tube having means at the bottom end thereof for grasping the handle of said valve to open and close said valve by turning said inner tube within said outer tube.

4. The housing of claim 3 and packing means between the sliding parts of the telescoping tube to provide a waterproof seal thereat.

* * * * *